US008485286B2

(12) United States Patent
Thompson

(10) Patent No.: US 8,485,286 B2
(45) Date of Patent: Jul. 16, 2013

(54) DRIVE CONFIGURATION FOR SKID STEERED VEHICLES

(75) Inventor: Robert William Thompson, Farmborough (GB)

(73) Assignee: Qinetiq Limited, London (GB)

( * ) Notice: Subject to any disclaimer, the term of this patent is extended or adjusted under 35 U.S.C. 154(b) by 609 days.

(21) Appl. No.: 12/664,986

(22) PCT Filed: Jul. 3, 2008

(86) PCT No.: PCT/GB2008/002295
§ 371 (c)(1),
(2), (4) Date: Dec. 16, 2009

(87) PCT Pub. No.: WO2009/013454
PCT Pub. Date: Jan. 29, 2009

(65) Prior Publication Data
US 2010/0184550 A1  Jul. 22, 2010

(30) Foreign Application Priority Data
Jul. 20, 2007  (GB) ................................. 0714069.2

(51) Int. Cl.
*B62D 11/04* (2006.01)
*B62D 11/14* (2006.01)
(52) U.S. Cl.
USPC ............... 180/6.44; 180/6.5; 180/6.7; 475/18
(58) Field of Classification Search
USPC ............... 180/6.28, 6.3, 6.24, 6.44, 6.5, 6.62, 180/6.48, 6.7, 65.23, 65.225, 65.235, 65.24; 475/5, 6, 18, 19
See application file for complete search history.

(56) References Cited

U.S. PATENT DOCUMENTS

| 5,168,946 | A  | * | 12/1992 | Dorgan ........................ 180/6.44 |
| 7,326,141 | B2 | * | 2/2008  | Lyons et al. .................... 475/28 |
| 2006/0019787 | A1 | | 1/2006 | Witzenberger et al. |
| 2007/0012505 | A1 | | 1/2007 | Walter |

FOREIGN PATENT DOCUMENTS

| WO | WO 02/083482 A1 | 10/2002 |
| WO | WO 02/083483 A1 | 10/2002 |
| WO | WO 2005/054041 A1 | 6/2005 |
| WO | WO 2005/054712 A1 | 6/2005 |
| WO | WO 2006/021745 A1 | 3/2006 |
| WO | WO 2007/077416 A1 | 7/2007 |
| WO | WO 2008/117025 A1 | 10/2008 |

OTHER PUBLICATIONS

U.K. Search Report issued in British Application No. GB0714069.2 on Nov. 15, 2007.
International Search Report issued in International Application No. PCT/GB2008/002295 on Sep. 17, 2008.

(Continued)

*Primary Examiner* — Anne Marie M Boehler
(74) *Attorney, Agent, or Firm* — Oliff & Berridge, PLC

(57) ABSTRACT

A drive configuration for a skid steered vehicle comprises a pair of electric motors for propulsion of the vehicle, one each coupled to drive a respective track on a respective side of the vehicle, and one or more electric steer motors coupled through a differential gear mechanism to impose a speed difference between the tracks. An associated control system controls the current to each motor so that substantial contributions to the differential torque to turn the vehicle are made both by the steer motors and by the propulsion motors, in variable proportions preferably as a function of the vehicle speed.

12 Claims, 3 Drawing Sheets

OTHER PUBLICATIONS

Written Opinion of the International Searching Authority issued in International Application No. PCT/GB2008/002295 on Sep. 17, 2008.

International Preliminary Report on Patentability issued in International Application No. PCT/GB2008/002295 on Jan. 26, 2010.

* cited by examiner

DRIVE CONFIGURATION FOR SKID STEERED VEHICLES

The present invention relates to a drive configuration for skid steered vehicles, that is to say vehicles which are steered by forcing the traction elements on opposite sides of the vehicle to run at different speeds. Skid steering is predominantly used with tracked vehicles, such as battle tanks, bulldozers and the like, although may also be applied to some specialist wheeled vehicles. The invention is particularly concerned with electric drive transmissions for such vehicles, that is to say where propulsion and steering are accomplished by means of electric motors coupled to the traction elements, typically powered by an onboard generator driven by a diesel engine or other prime mover, and it is in the context of such transmissions that the invention will be more particularly described. Electric drive transmissions are known in the art, and have been proposed particularly for military armoured vehicles, where the mechanical separation of the power-generating and driving components—with power transfer through electrical conductors and not exclusively through mechanical components—can substantially simplify the drive train and offer greater freedom in locating relevant components within the vehicle structure. Nevertheless it is also within the scope of the invention for the respective motors to be powered other than electrically if appropriate, for example in a configuration comprising hydraulic motors.

The invention furthermore relates to a drive configuration (hereinafter referred to as "a drive configuration of the kind stated") comprising at least two motors for propulsion of the vehicle, one each coupled to drive a respective drive member to a respective side of the vehicle (e.g. for connection to a track drive sprocket or wheel hub), and at least one steer motor coupled through a differential gear mechanism to impose a speed difference between such drive members. An example of a configuration of this kind is known from WO-02/083483 and WO-2006/021745. It comprises a transverse drive arrangement comprising a pair of propulsion motors each of which drives a respective shaft which is coupled through other transmission components to a respective track drive sprocket or wheel transmission unit on a respective side of the vehicle. At their inboard ends these shafts are coupled to opposite sides of a controlled differential device having input from a steer motor or motors and through which the required speed differences can be imposed on the shafts to steer the vehicle, while power from the slower running shaft is mechanically regenerated to the faster running shaft though the differential. Another example is known from WO-02/083482. In this case there are a pair of propulsion motors located on opposite sides at one end of the vehicle and each coupled to drive a respective track drive sprocket on the respective side of the vehicle. At the other end of the vehicle a steer motor is coupled through a controlled differential device to drive two cross-shafts, each connected to a respective second track drive sprocket on the respective side of the vehicle, and thereby to impose the required speed differences on the tracks to steer the vehicle. In this case the two propulsion motors are effectively coupled to the differential through the tracks of the vehicle for mechanical regeneration of power from the slower running to the faster running side.

The differential torque required to effectively steer a skid steered vehicle increases as vehicle speed reduces. In addition the speed difference between the traction elements (tracks or wheels) on opposite sides of the vehicle that is required to achieve a desired rate of turn—and hence the speed of the steer motor(s) in a prior art configuration of the kind stated—increases as vehicle speed reduces. In the case of the prior art drive configurations of the kind stated where all steering torque is required to be provided by the steer motor(s) acting through the differential gear mechanism, therefore, the torque of the steer motor(s), and more significantly the power (torque×speed) required from the steer motor(s), rises rapidly as the vehicle speed reduces. In this respect the power rating required for the steer motor(s) is typically equivalent to around half the total power required for propulsion.

To provide good mobility (e.g. to enable the vehicle to climb over obstacles), propulsion motors are designed to give high torque at low speed and the present invention is predicated at least in part on the realisation that at low vehicle speed the propulsion motors in a configuration of the kind stated can have the capability also to assist steering without over rating above their normal propulsion requirements. In this respect the torque output capability of the propulsion motors at low speed for mobility is typically twice the torque required for differential steering. At higher vehicle speeds, however, the torque output of propulsion motors is limited by their power rating and so they could not necessarily also contribute, or contribute so much, to vehicle steering.

With the foregoing in mind, in one aspect the present invention resides in a drive configuration of the kind stated comprising control means adapted to control the operation of the motors whereby in use, under at least some operating conditions, a substantial contribution to the differential torque to turn the vehicle is made both by the propulsion motors and by the steer motor(s).

In another aspect, the invention resides in a method of controlling the operation of the motors in a drive configuration of the kind stated, wherein under at least some operating conditions a contribution to the differential torque to turn the vehicle is made both by the propulsion motors and by the steer motor(s).

More particularly in accordance with the invention the operation of the motors is controlled as a function of vehicle speed so that over a lower range of vehicle speeds the propulsion motors contribute the majority of the differential torque to turn the vehicle while over an upper range of vehicle speeds the steer motor(s) contribute the majority of such differential torque.

These and other features of the invention will now be more particularly described, by way of example, with reference to the accompanying drawings, in which:—

Figure 1:
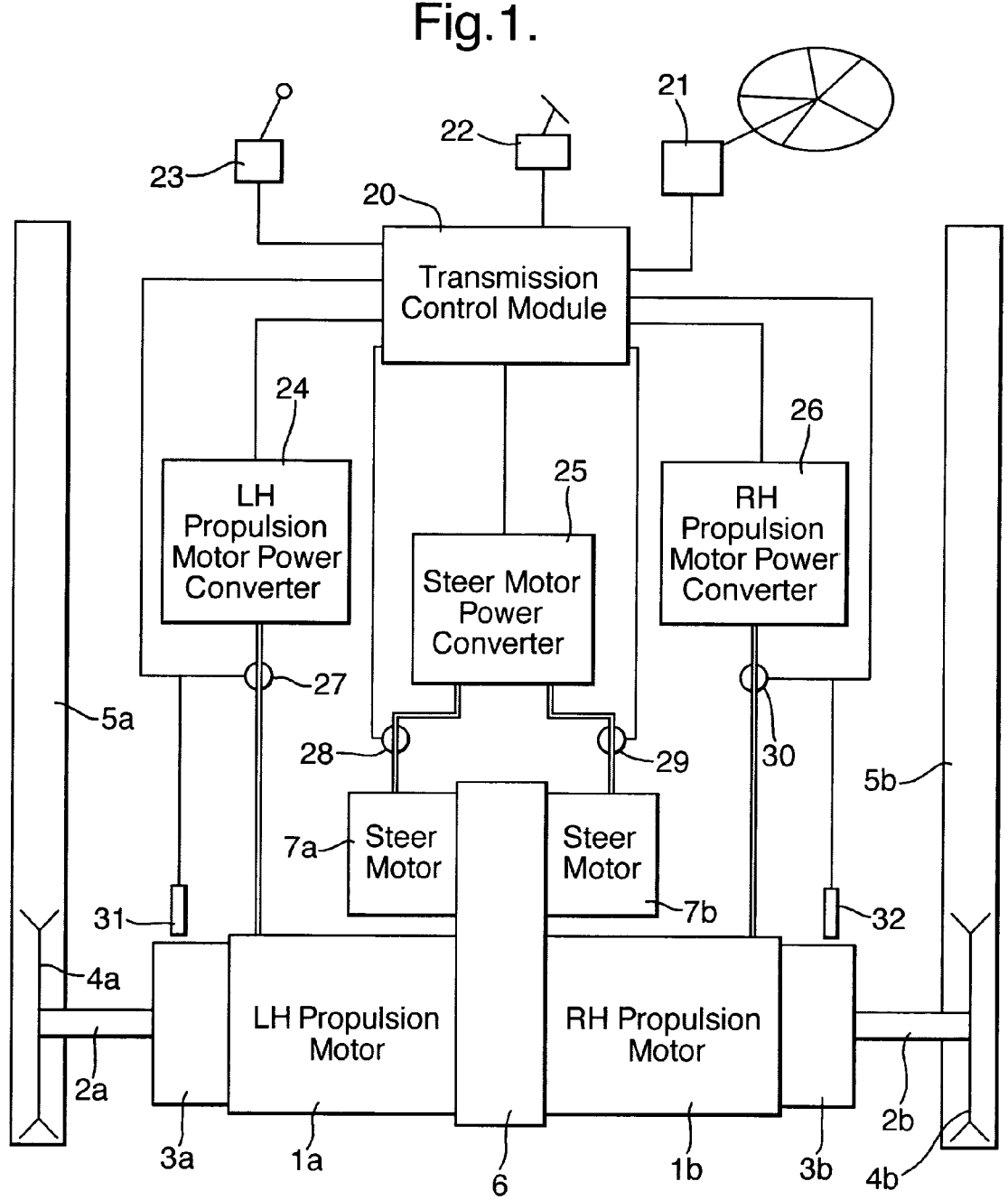
FIG. 1 is a simplified diagram of a preferred embodiment of a drive configuration according to the invention together with its electrical control system.

Referring to FIG. 1, this illustrates schematically both the mechanical layout of an embodiment of the drive configuration according to the invention and its electrical control system, although for ease of illustration both the basic electrical power source (generator) and its connections to the various motor power converters are omitted. In the control system the thicker lines depict power conductors and the thinner lines depict the paths of control and/or data signals.

Mechanically, the configuration is generally as known from WO-02/083483 and/or WO-2006/021745. It is a transverse drive arrangement comprising two electrical propulsion motors 1a and 1b and associated transmission trains. Each motor 1a, 1b drives a respective shaft 2a, 2b through an integrated gear (range) change unit 3a, 3b. Outboard of these motors the shafts 2a, 2b will be coupled through respective gear reduction stages, brakes and final drives (not shown) to drive sprockets 4a, 4b for respective tracks 5a, 5b on opposite sides of the vehicle. Inboard the motors 1a, 1b are coupled through the shafts 2a, 2b to opposite sides of a controlled differential device 6 having an input from a coupled pair of electric steer motors 7a, 7b.

Figure 2:
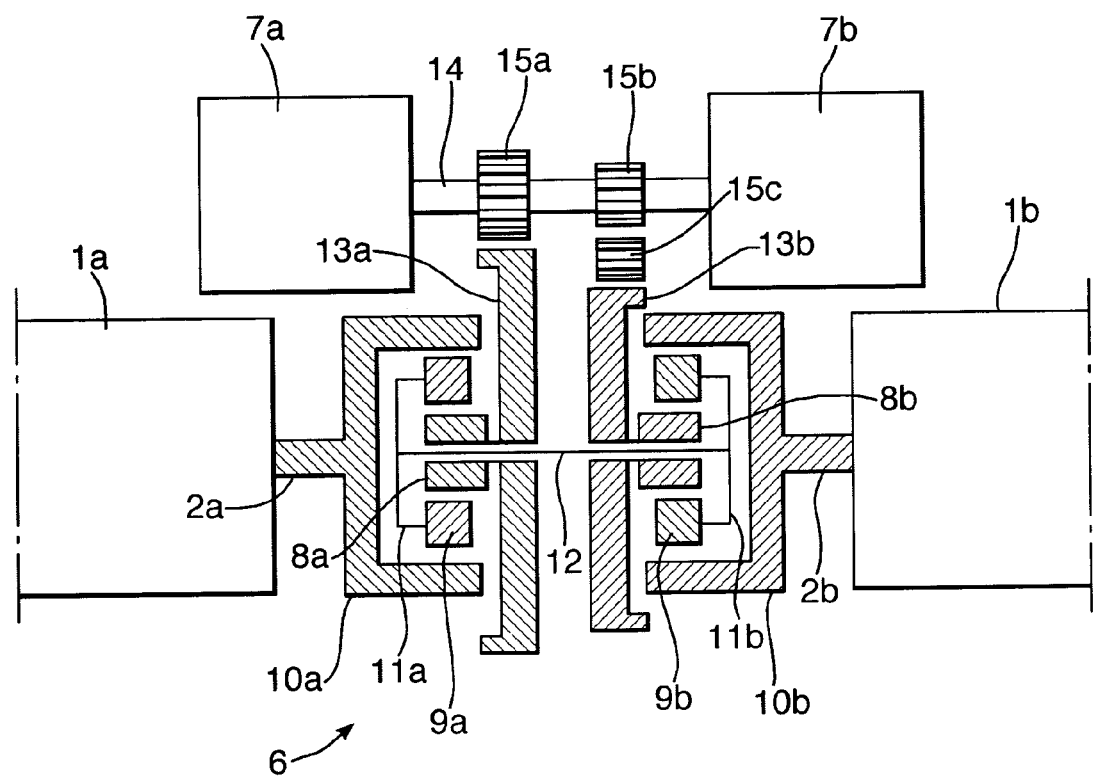
FIG. 2 illustrates schematically one form of differential gear mechanism for use in the configuration of FIG. 1.

The mechanism of one suitable form of differential 6 is illustrated schematically in FIG. 2. It comprises an opposed pair of planetary gear sets each comprising a sun gear 8a, 8b, planet gears 9a, 9b and an annulus or ring gear 10a, 10b, with the planet carriers 11a, 11b of each set interconnected by a cross shaft 12 passing through the sun gears. The annuli 10a, 10b are coupled to the respective adjacent drive shafts 2a, 2b and the sun gears 8a, 8b are fast with respective input gears 13a, 13b which can be driven when required by the steer motors 7a, 7b. The steer motors are in this respect each coupled to a shaft 14 carrying a pinion 15a meshing with gear 13a, and a pinion 15b meshing through an idler gear 15c with gear 13b, so that the direction of rotation of the gear 13b in response to rotation of the shaft 14 is reversed as compared to the direction of rotation of the gear 13a.

During straight running of the vehicle the steer motors 7a, 7b are energised to hold the shaft 14 stationary, so the input gears 13a, 13b and sun gears 8a, 8b are likewise held stationary. Energising the propulsion motors 1a, 1b to drive the sprockets 4a, 4b in this condition also rotates the annuli 10a, 10b to cause the planet gears 9a, 9b to revolve about the sun gears 8a, 8b. Due to their connection by the shaft 12 the two planet carriers 11a, 11b must rotate at the same speed, also equalising the speeds of the two annuli 10a, 10b and the two connected shafts 2a, 2b and related transmission trains in this condition. While equal electrical power is supplied to both motors 1a and 1b in this condition, the actual power distribution between the two transmissions will be determined by the torque required to drive the respective sprockets 4a, 4b with torque being transferred through the controlled differential 6 from one side to the other as required e.g. in respect to changing ground conditions.

Consider now steering of the vehicle, while being propelled by the motors 1a, 1b as above, by use only of the steer motors 7a, 7b. To turn the vehicle in one sense the steer motors are energised to rotate the shaft 14 in a corresponding sense, thus causing the input gears 13a, 13b and their respective sun gears 8a, 8b to rotate in mutually opposite senses. The effect, since the two planet carriers 11a, 11b must always turn together, is to increase the rate of rotation of the individual planet gears 9a or 9b in that set for which the sun gear 8a or 8b is turning in the opposite sense to the respective annulus 10a or 10b, and to decrease the rate of rotation of the individual planet gears 9a or 9b in that set for which the sun gear 8a or 8b is turning in the same sense as the respective annulus 10a or 10b. This in turn causes the annuli 10a, 10b and respective connected transmissions to the sprockets 4a, 4b to run at different speeds thus turning the vehicle in the required sense, while power from the slower running transmission is mechanically regenerated to the faster running transmission through the controlled differential 6. To turn the vehicle in the opposite sense the steer motors 7a, 7b are energised to rotate the shaft 14 in the opposite sense and so forth, and it will be appreciated that for a given forward speed of the vehicle the turning radius in either sense will depend on the speed at which the steer motors are operated—the faster the steer motors the tighter the turn.

Alternative forms of controlled differential for use in place of the mechanism described above (and with consequent adaption of the gearing between shafts 2a, 2b and sprockets 4a, 4b) are described in PCT/GB2006/004694 and PCT/GB2008/000970.

In accordance with the present invention, however, at least at lower vehicle speeds the differential torque required to steer the vehicle is not produced solely from the steer motors 7a, 7b but the propulsion motors 1a, 1b are also controlled differentially to contribute to steering.

Returning to FIG. 1, the electrical control system for the illustrated embodiment includes a main transmission control module 20 with inputs from a driver's steering control 21, speed/acceleration control 22 and direction and gear range control 23. The module 20 controls respective power converters 24, 25 and 26, which are fed from the associated generator (not shown), for the propulsion motor 1a, steer motors 7a, 7b and propulsion motor 1b. Current sensors 27-30 feed back information to the module 20 on the electrical current being supplied to respective motors 1a, 7a, 7b and 1b, which can be used to determine their respective torque output with sufficient accuracy to allow adequate control. Speed sensors 31 and 32 feed back information to the module 20 on the respective speeds of the transmission at the outputs from the respective gear changes 3a and 3b, from which the vehicle speed can also be calculated, and each power converter 24-26 will also sense the speed of their respective motor(s).

In use of this system the transmission control module 20 will monitor the torque and speed of each motor and the speed of the vehicle, and will implement the driver's demand for steering and acceleration by controlling the power converters 24-26 to demand torque and speed from each motor in accordance with a predetermined strategy programmed into the module. In general terms the steer motors 7a, 7b will be controlled to run at a speed proportional to the steer input and the torque at the propulsion motors 1a, 1b will be proportional to the acceleration demand. However at least at lower vehicle speeds the system will also demand torque differences from the propulsion motors to assist, or even take over from, the steer motors. In general terms, during normal progress of the vehicle, this will be accomplished by increasing the current to one propulsion motor and decreasing the current to the other propulsion motor (depending on the required direction of turn) in effectively equal amounts. Any suitable power control techniques generally known in the art may be employed in this system. For example when the motors 1a and 1b are permanent magnet motors some "field weakening" may also be performed by shifting the phase of the current at higher motor speeds; in the case of induction motors the frequency of the current will also be controlled to achieve the required torque output.

Figure 3:
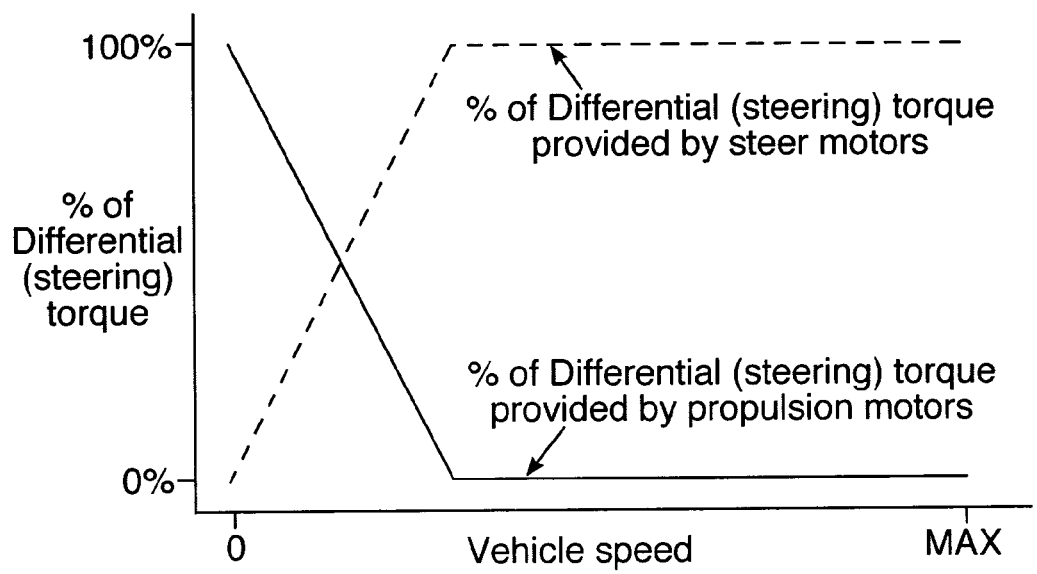
FIG. 3 illustrates a motor control strategy for the configuration of FIG. 1 in terms of the respective percentages of differential (steering) torque contributed by the steer motors and by the propulsion motors as a function of vehicle speed.

FIG. 3 illustrates one simple strategy for steering control where the percentages of differential torque for steering contributed by the steer motors and by the propulsion motors are varied as a function of vehicle speed. Above approximately one third of the maximum vehicle speed all steering is accomplished by the steer motors 7a, 7b, acting on the controlled differential 6 and causing mechanical regeneration of steering power. Below this speed the differential steering torque demand is progressively transferred to the propulsion motors 1a, 1b and at zero speed all steering torque is provided by the propulsion motors. The latter condition applies to a so-called neutral or pivot turn, where the vehicle turns on the spot with one track 5a or 5b being driven forwards and the other track being driven backwards. In this example all the power for a neutral turn comes from the propulsion motors with the steer motors being spun at high speed by the propulsion motors through the differential 6, or energised just to relieve the propulsion motors of that load, but not required to contribute any power for the turn.

Figure 4:
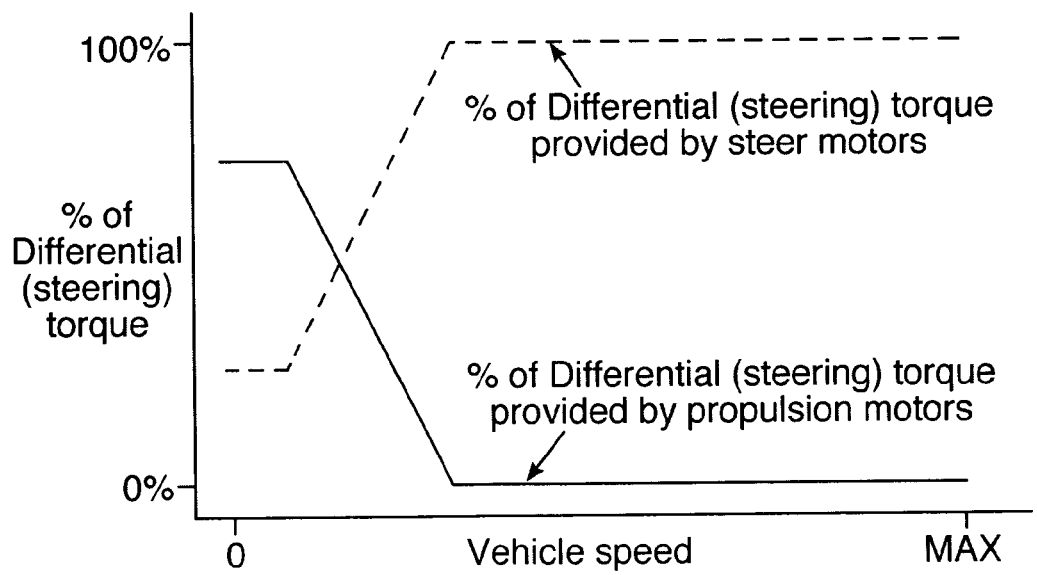
FIG. 4 illustrates a variant of the strategy of FIG. 3.

Many variations of the illustrated control strategy are of course possible to optimise the rating and utilisation of the various motors and in practice any optimal strategy is likely to be more complex than that depicted in FIG. 3. For example the straight line characteristics shown in the Figure may instead be curves; a fully 100%:0% ratio of the steering torque contributions between the two classes of motor may not actually be reached at the upper and/or lower limits of vehicle speed; and/or there may be a more extensive (flatter) region of the characteristics at the lower end of the vehicle speed range over which the propulsion motors make their maximum contribution to the steering torque. Furthermore different strategies may be adopted depending on which gear range is selected at units 3a, 3b. For example, although while operating in low range at low vehicle speed the propulsion motors will generally have sufficient torque to perform the majority of steering function, when high range is selected in which the propulsion motors can provide less torque to the traction elements more reliance on the steer motors may have to be made and a strategy more akin to that illustrated in FIG. 4 may be used.

Furthermore the control strategy could be adapted by the control module depending on the driving duty cycle and other conditions to best utilise the steer and propulsion motors. For example the temperatures of the motors, which will usually be monitored by the respective power converters to give protection from overheating, could be used as a criterion to determine the split of power between the steer motors and propulsion motors for steering. In this way, for example, the burden of providing differential torque for steering would be shifted further to the steer motors if the propulsion motors became hot due to some arduous driving condition.

Further considerations and advantages relative to the present invention are discussed as follows.

For a high speed military tracked vehicle using a drive configuration of the kind stated, the torque available from the propulsion motors above approximately one third of the maximum vehicle speed is relatively low, due to power output limitations (assuming that they are sized purely for propulsion) and therefore the steer motor(s) must be rated to provide all or at least most of the steering capability at or above this vehicle speed. This requirement determines the minimum necessary steer motor torque and power rating. The power rating of the steer motor(s) to meet this requirement is typically half the rating required for achieving adequate steering performance at low speed when no contribution to steering capability is made by the propulsion motors. The propulsion motors do not need to be rated above their requirements for propulsion in order to contribute to steering at low vehicle speeds, however. Implementing the present invention can therefore allow lower rated steer motor(s) to be used than in the case where the steer motor(s) are required to provide all of the steering capability over the whole vehicle speed range, without any increase in rating of the propulsion motors, with corresponding savings on the size and weight of the transmission.

Consider also the utilisation of the various motors. Use of the propulsion motors for steering at medium to high speeds would place significant demands on the motor and power electronics as a proportion of the steering power will then be regenerated electrically. In this condition it is more effective to utilise the steer motor(s) and differential gear mechanism to mechanically regenerate the steering power and so maintain a lower temperature in the propulsion motors. This improves vehicle overall efficiency, improves propulsion motor reliability and allows them to be used at higher power for short bursts of acceleration. Also at low vehicle speed where there is little or no regeneration of steering power the propulsion motors have sufficient torque and power capability to make a high contribution to the steering effort or even to steer the vehicle on their own. Minimising or eliminating use of the steer motor(s) in these conditions is therefore more efficient and maintains a lower temperature in the steer motor(s) for use at higher power intermittently for steering at higher vehicle speeds. Such a control strategy therefore reduces the demands of the duty cycle for each motor and in the case of the steer motor(s) allows the use of smaller devices more sized for intermittent use, rather than more continuous use as in the case of prior art configurations of the kind stated.

The invention claimed is:

1. A drive configuration for a skid steered vehicle, the drive configuration comprising:
    at least two propulsion motors, each propulsion motor being coupled to drive a respective drive member on a respective side of the skid steered vehicle;
    at least one steer motor coupled through a differential gear mechanism to impose a speed difference between the drive members; and
    a control system adapted to control operation of the at least two propulsion motors and the steer motor(s), wherein
    under at least some operating conditions of the skid steered vehicle, substantial contributions to a differential torque to turn the skid steered vehicle are made simultaneously by both a differential operation of the at least two propulsion motors and by an operation of said steer motor(s), and
    at vehicle speeds above a certain value, the steer motor(s) contribute(s) a majority of the differential torque.

2. The drive configuration according to claim 1, wherein, over a certain range of vehicle speed, the contribution to the differential torque from the at least two propulsion motors increases and the contribution to the differential torque from said steer motor(s) decreases, with decreasing vehicle speeds.

3. The drive configuration according to claim 1, wherein, at vehicle speeds below a certain value, the at least two propulsion motors contribute the majority of the differential torque.

4. The drive configuration according to claim 3, wherein, at a zero vehicle speed, the at least two propulsion motors contribute substantially all of the differential torque.

5. The drive configuration according to claim 1, wherein, at vehicle speeds above a certain value, said steer motor(s) contribute(s) substantially all of the differential torque.

6. The drive configuration according to claim 1, wherein the at least two propulsion motors and the steer motor(s) are electric motors.

7. A vehicle equipped with the drive configuration according to claim 1.

8. A method of controlling an operation of motors in a drive configuration for a skid steered vehicle comprising at least two propulsion motors, each propulsion motor being coupled to drive a respective drive member on a respective side of the skid steered vehicle, and at least one steer motor coupled through a differential gear mechanism to impose a speed difference between the drive members, the method comprising:
    operating the at least two propulsion motors differentially and operating said steer motor(s) under at least some operating conditions of the vehicle, wherein substantial contributions to a differential torque to turn the skid steered vehicle are made simultaneously both by the at least two propulsion motors and by said steer motor(s), and at vehicle speeds above a certain value, the steer motor(s) contribute(s) a majority of the differential torque.

9. The method according to claim 8, wherein, over a certain range of vehicle speed, the contribution to the differential torque from the at least two propulsion motors increases and the contribution to the differential torque from said steer motor(s) decreases with decreasing vehicle speeds.

10. The method according to claim 8, wherein, at vehicle speeds below a certain value, the at least two propulsion motors contribute a the majority of the differential torque.

11. The method according to claim 10, wherein, at a zero vehicle speed, the at least two propulsion motors contribute substantially all of the differential torque.

12. The method according to claim 8, wherein, at vehicle speeds above a certain value, said steer motor(s) contribute(s) substantially all of the differential torque.

* * * * *